(12) United States Patent
Cherukuri et al.

(10) Patent No.: US 7,610,500 B2
(45) Date of Patent: Oct. 27, 2009

(54) LINK POWER SAVING STATE

(75) Inventors: Naveen Cherukuri, San Jose, CA (US);
Jeffrey R. Wilcox, Folsom, CA (US);
Sanjay Dabral, Palo Alto, CA (US);
Phanindra K. Mannava, Folsom, CA (US);
Aaron T. Spink, San Francisco, CA (US);
David S. Dunning, Portland, OR (US);
Tim Frodsham, Portland, OR (US);
Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 11/950,292

(22) Filed: Dec. 4, 2007

(65) Prior Publication Data

US 2008/0091963 A1    Apr. 17, 2008

Related U.S. Application Data

(62) Division of application No. 10/850,733, filed on May 21, 2004, now Pat. No. 7,313,712.

(51) Int. Cl.
*G06F 1/00* (2006.01)
*H04B 1/38* (2006.01)
*H04L 27/00* (2006.01)
*H04L 1/00* (2006.01)

(52) U.S. Cl. ................ 713/320; 713/300; 455/73; 375/295; 375/316; 370/235

(58) Field of Classification Search ........ 713/300, 713/320; 455/73; 375/295, 316; 370/235
See application file for complete search history.

(56) References Cited

U.S. PATENT DOCUMENTS

| | | | |
|---|---|---|---|
| 5,706,110 A | 1/1998 | Nykanen | |
| 5,838,720 A * | 11/1998 | Morelli | ............ 375/219 |
| 6,009,488 A | 12/1999 | Kavipurapu | |
| 6,463,542 B1 | 10/2002 | Yu et al. | |
| 6,526,469 B1 | 2/2003 | Drehmel et al. | |

(Continued)

OTHER PUBLICATIONS

Non-Final Office Action received for U. S. Appl. No. 10/850,733, mailed on Apr. 11, 2007.

(Continued)

*Primary Examiner*—Mark Connolly
*Assistant Examiner*—Stefan Stoynov
(74) *Attorney, Agent, or Firm*—Caven & Aghevli LLC (57) ABSTRACT

Disclosed are embodiments of a method, apparatus and system for a low power state for a point-to-point link. During the low power state, the signal on both conductors of a differential transmit pair are driven to electrical idle. Analog activity detectors are enabled during the low power state and are disabled during normal power state. Exit from the low power state does not require a physical layer re-initialization sequence. Other embodiments are also described and claimed.

9 Claims, 8 Drawing Sheets

U.S. PATENT DOCUMENTS

| | | |
|---|---|---|
| 6,593,801 B1 | 7/2003 | Hattori |
| 6,993,667 B1 | 1/2006 | Lo |
| 7,028,199 B2 | 4/2006 | Ayyavu et al. |
| 7,058,833 B1 | 6/2006 | Bremer et al. |
| 7,146,510 B1 * | 12/2006 | Helms et al. ............... 713/300 |
| 7,197,654 B2 | 3/2007 | Olsen |
| 7,313,712 B2 | 12/2007 | Cherukuri et al. |
| 7,389,528 B1 | 6/2008 | Beser |
| 7,466,996 B2 * | 12/2008 | Carballo ..................... 455/574 |
| 2003/0198296 A1 | 10/2003 | Bonelli et al. |
| 2004/0103333 A1 | 5/2004 | Martwick et al. |
| 2005/0215274 A1 | 9/2005 | Matson et al. |
| 2008/0075107 A1 | 3/2008 | Cherukuri et al. |
| 2008/0077814 A1 | 3/2008 | Cherukuri et al. |

OTHER PUBLICATIONS

Non-Final Office Action received for U.S. Appl. No. 11/949,770, mailed on Apr. 3, 2009.

Bhatt, Ajay V., "Creating a Third Generation I/O Interconnect", Technology and Research Labs, Intel Corporation, 2002, pp. 1-8.

"PCI Express Base Specification", Revision 1.0a, Apr. 15, 2003, pp. 1-430.

Steve Krig, "Initiatives and Technologies", Intel Corporation, White Paper, 2003, 8 pages.

\* cited by examiner

LINK POWER SAVING STATE

RELATED APPLICATION(S)

This application is a divisional of U.S. application Ser. No. 10/850,733, filed May 21, 2004 to which priority is claimed under 35 U.S.C. 120. The entire teachings of the above application are incorporated herein by reference.

BACKGROUND

1. Technical Field

The present disclosure relates generally to information processing systems. More particularly, one or more embodiments relate to power management on a point-to-point data link.

2. Background Art

A computing system may include various elements, including a processor as well as other components that communicate with the processor. These other components may include an input/output hub and a memory hub. The input/output hub and memory hub may be incorporated into a single component referred to as a chipset. The computing system may also include other components such as a graphics controller, memory, and peripheral devices.

Elements of a computing system communicate with each other according to one or more communications protocols. Many standard protocols used in common processing systems are multi-drop parallel bus implementations. Other protocol implementations have begun to appear in processing systems. Point-to-point interconnect protocols are an example of such other protocol implementations.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method, apparatus and system for a low power state for a point-to-point link.

DETAILED DESCRIPTION

Described herein are selected embodiments of an apparatus, system and methods for a low power state for a point-to-point physical interconnect. The point-to-point physical interconnect may be based on the Common System Interface (CSI). CSI is a cache-coherent, point-to-point interconnection specification. Each CSI agent has one or more ports. The physical interconnect between a port of one CSI agent and a port of another CSI agent includes two uni-directional links, one in each direction. Each CSI agent may thus have as many physical interconnects as it has ports. For at least one embodiment, each CSI port includes in the physical layer one or more differential transmit pairs and one or more differential receive pairs. The physical layer for a CSI port thus includes at least two differentially driven pairs of signals: a transmit pair and a receive pair.

In the following description, numerous specific details such as data packet bit lengths, timer definitions, agent layer functionality, and order of control flow for operations of a method have been set forth to provide a more thorough understanding of the present invention. One skilled in the art will appreciate, however, that the invention may be practiced without such specific details. Additionally, some well-known structures, circuits, and the like have not been shown in detail to avoid unnecessarily obscuring the present invention.

Disclosed herein are embodiments of a method, apparatus and system for providing a low power state for communication links in a point-to-point physical interconnect. The low power state may be applied to one uni-directional link of the interconnect while normal communications are allowed to continue in a normal power state on the other (opposite-direction) link.

For embodiments wherein an agent has more than one port, one link for each of multiple physical interconnects may be placed in the low power state, while the other link for each of the interconnects remain active. Alternatively, both links of a physical interconnect may be in the low power state concurrently, though each link may enter and exit L0s state independently of the other link.

For some commonly-used systems, a flow control mechanism is used to facilitate reliable data transmission across the link. Such mechanism sends information across the link continuously. This implies, during periods when there is no meaningful payload to be sent on the link, the link nonetheless continues to send idle packets, solely for the purpose of maintaining flow control between two connected ports. Although, these idle packets carry no meaningful payload data, they still result in power consumption.

The inventors have determined that power savings can be achieved during periods of link inactivity by temporarily disabling flow control, thereby eliminating the need to maintain link traffic during periods of link inactivity. For at least one embodiment, flow control is disabled during a low power state, as is described more fully below. When the link is in such a low power state, certain hardware circuits may be powered down to conserve power.

Any of several criteria can be used to initiate this low power mode. For at least one embodiment, the trigger condition for initiating the low power mode occurs when an output transaction queue for the agent associated with the transmit port is empty, or reaches a minimum threshold. For alternative embodiments, the trigger condition may reflect a software-triggered event, an event triggered by a higher protocol layer, a power management event, or the like.

Upon entering this low power mode, referred to herein as L0s, the link may be maintained in a state referred to herein as an Electrical Idle (EI) state. Electrical Idle state is defined as the condition where both halves of a differential pair have a zero voltage differential across them. The voltage differential need not be absolutely zero volts, but may be a value below a low threshold value that represents 0 V differential. For at least one embodiment, EI state can be accomplished by maintaining ground potential on both halves of a differential pair. Other embodiments may use a different potential (Vcc, Vcc/2 etc.) on both halves, which still meets the definition of Electrical Idle.

Maintaining a link in EI state may not require power consumption. For instance, an embodiment may use pull-down terminations at the transmitter to maintain a lane in EI. Such an embodiment may have ground referenced terminations at the receiver, for normal operation. As both transmitter and receiver are terminated to the same voltage, no current flows through the link and hence no power is consumed.

When a link enters the L0s state, analog activity detection circuitry may be activated for the receiving hardware of the link. The analog activity detection circuitry is, for at least one embodiment, a low power circuit that monitors a link for transition out of Electrical Idle. A break from Electrical Idle, which may be determined when a differential swing is detected across a differential pair, may be utilized as an indication that the transmitter is ready to exit from L0s. The transmitter may break Electrical Idle in response to a trigger condition, such as determining that at least a threshold number of packets are awaiting transmission on the link. (Of course, other trigger conditions may be utilized).

The receiver may initiate an L0s exit sequence in response to the L0s-exit trigger condition (such as a break in Electrical Idle), in order to return to a normal power state. The analog detection circuitry may be de-activated when the link returns to the normal power state.

For embodiments of the L0s state disclosed herein, performance of a link may be evaluated in terms of the time taken to exit L0s and re-establish flow control. While such actions might be accomplished by completely reinitializing certain link hardware, the inventors have deemed such approached to require an unacceptably long time span. Such a hypothetical wake up time can allow for completely powering down the physical layer at the expense of impractical wake-up time.

Instead, embodiments of the L0s state disclosed herein provide a trade-off between performance and power savings by facilitating the use of a configurable wake-up time. For such embodiments, both ports of a link may be associated with a common L0s wake-up time. Such wake-up time is a predefined value that may be a static constant value or a dynamically determined value. When the L0s state is initiated on a link, the current L0s wake-up time in effect is used to determine which hardware circuits should be powered down in the transmitting and receiving ports of the link. The powered-down circuits are chosen such that they can later be powered-up within the predetermined wake-up time, once decision to exit L0s has been made.

Figure 1:
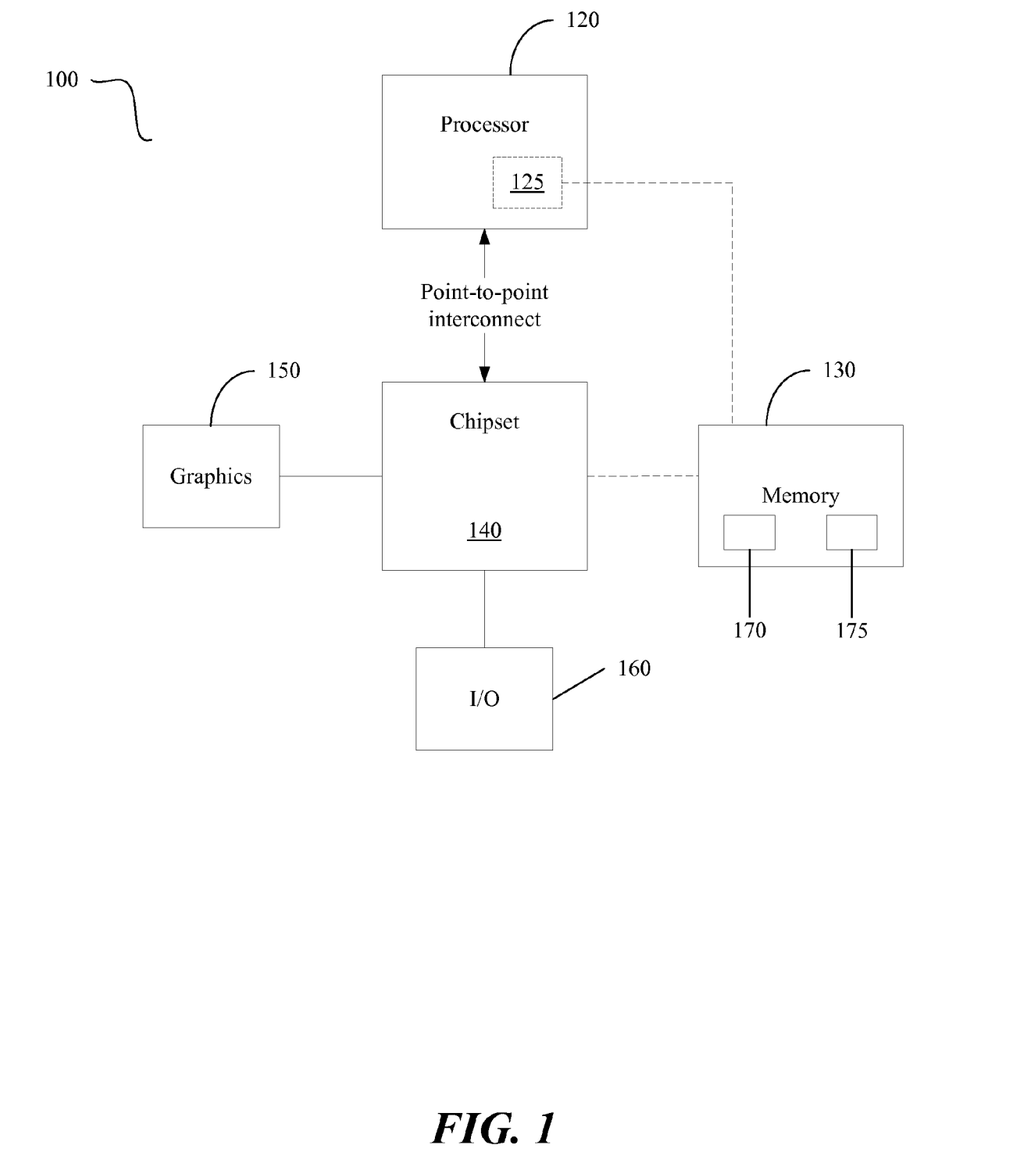
FIG. 1 is a block diagram of a computing system having a point-to-point interface according to at least one embodiment of the present invention.

FIG. 1 is a block diagram illustrating a processing system 100 that utilizes a point-to-point interconnect interface. The system 100 includes a processor 120. The processor 120 may include one or more processing cores. The processor 120 may also include one or more caches. The system 100 may include a memory system 130.

Memory system 130 may store instructions 170 and data 175 for controlling the operation of the processor 120. Memory system 130 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 130 may store instructions 170 and/or data 175 represented by data signals that may be executed by the processor 120.

In addition, the processor 100 may optionally include an integrated memory controller 125. For such embodiments, the integrated memory controller 125 provides an interface to the memory system 130. Also for such embodiments, a chipset 140 primarily supports graphics-related functionality in conjunction with a graphics component 150. The chipset 140 may also provide connectivity with input/output (I/O) devices 160. For at least one embodiment, chipset 140 may include one or more chipset devices, with each chipset device providing separate interface functionality. For example, one of the chipset devices may support graphics functionality while another chipset device may support I/O connectivity and/or interface with a firmware hub (not shown).

For at least one other embodiment, the processor 120 does not include an integrated memory controller 125. For such embodiment, the chipset 140 provides memory control functionality as well as the graphics, I/O and/or firmware functionality described above. For such embodiment, the chipset 140 provides an interface to the memory system 130.

The processing system 100 may be incorporated into any of several platforms, including desktop, mobile and server platforms. For any of these platforms, the processing system may further be based on any type of processor architecture, including 16-bit, 32-bit, 64-bit and 128-bit processor architectures.

Figure 8:
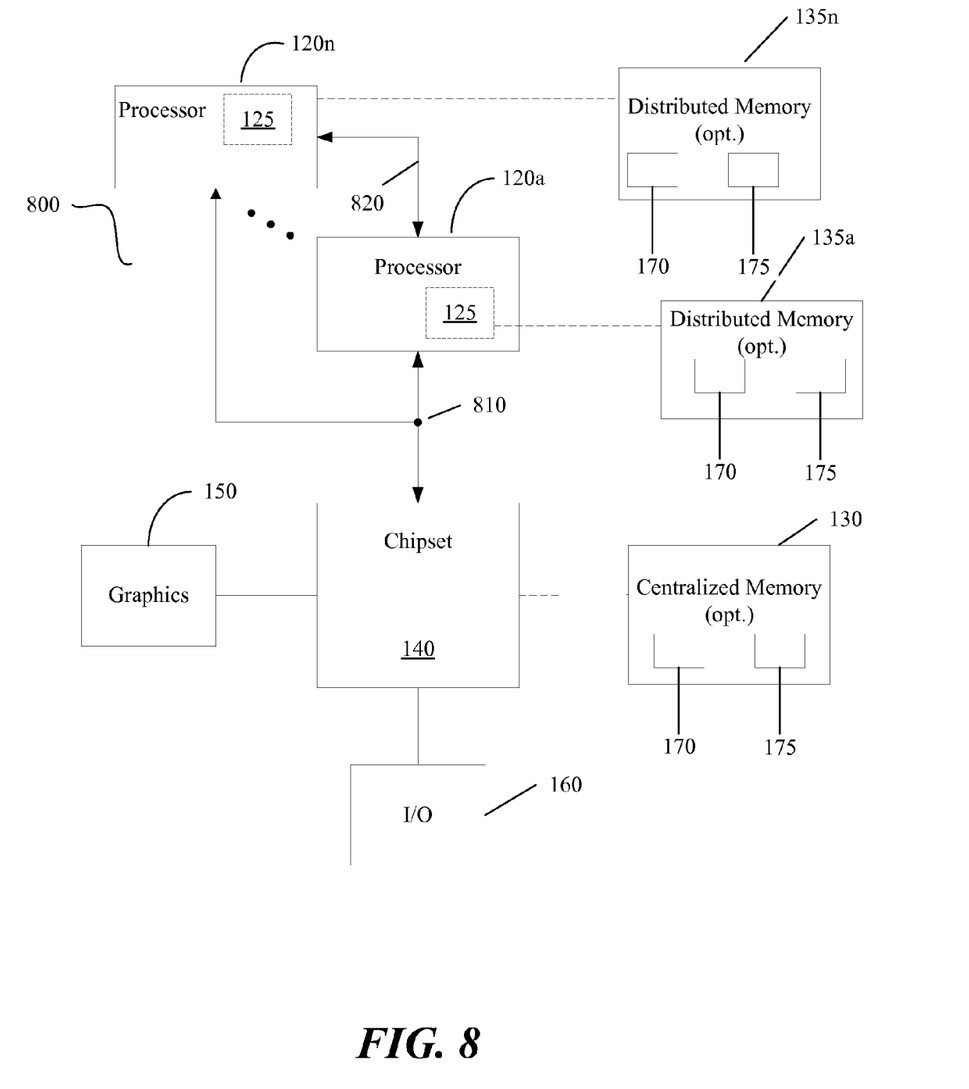
FIG. 8 is a block diagram of a multi-processor computing system having a point-to-point interface between processors.

FIG. 1 illustrates that at least one embodiment of the processor 120 includes an external point-to-point interface 160 with the chipset 140. The interface 160 may be a link interface based on the Common System Interface (CSI) interconnect specification. Accordingly, the processor 120 and the chipset 140 may each be CSI agents in that they each host one or more ports that are compliant with the CSI interface specification Turning briefly to FIG. 8, it can be seen that, for at least one other embodiment, a system 800 may include multiple processors 120a-120n. In FIG. 8, like elements for those elements discussed above in connection with FIG. 1 are given like reference numerals. Although only two processors 120a, 120n are shown in FIG. 8, any number (n) of processors 120 may be present in system 800.

FIG. 8 illustrates that a processor 120a may include an interface 820 with one or more other processors 120n. For at least one embodiment, the interface 820 between each processor 120 of the multi-processor system 800 is a point-to-point interface. For other embodiments, the interface 820 may be a multi-drop bus interface. The processor-to-processor interface 820 may help provide additional network bandwidth and may also help reduce latency of cache snoops of another processor's cache. In addition, the interface 820 may also reduce latency of direct cache-to-cache transfers of instructions 170 and/or data 175.

As with the embodiments discussed above in connection with FIG. 1, processors 120a-120 may each include an integrated memory controller 125 that provides an interface to a dedicated portion 135 of a distributed memory system. Alternatively, the memory controller function may be provided by a chipset 140. For the latter embodiment, the chipset 140 provides a memory interface and memory controller function with a centralized main memory 130.

The interface 810 between a processor 120 and the chipset 140 is illustrated in FIG. 8 as a multi-drop interface between the chipset 140 and all processors 120a-120n. However, one of skill in the art will recognize that a separate interface 810 between each processor 120a-120n and the chipset 140 could, for alternative embodiments, be a point-to-point interface. A single system 800 may include one or more multi-drop interfaces, such as, for example, interface 810, along with one or more point-to-point interfaces, such as, for example, interface 820.

Embodiments of the methods disclosed herein may be performed in a processing system such as the systems 100, 800 shown in FIGS. 1 and 8, respectively. Systems 100 and 800 are representative of processing systems that include Itanium® and Itanium® 2 microprocessors and Pentium®, Pentium® Pro, Pentium® II, Pentium® III, Pentium® 4 microprocessors, as well as Pentium® M microprocessors, all of which are available from Intel Corporation. Systems 100 and 800 are also representative of processing systems, such as cellular telephones, personal digital assistants, portable video players, portable media players and other handheld devices based on the Intel® XScale™ technology. Other systems (including personal computers (PCs) and servers having other microprocessors, engineering workstations, set-top boxes and the like) may also be used. At least one embodiment of system 100 and/or 800 may execute a version of the Windows™ operating system available from Microsoft Corporation, although other operating systems and graphical user interfaces, for example, may also be used.

Figure 2:
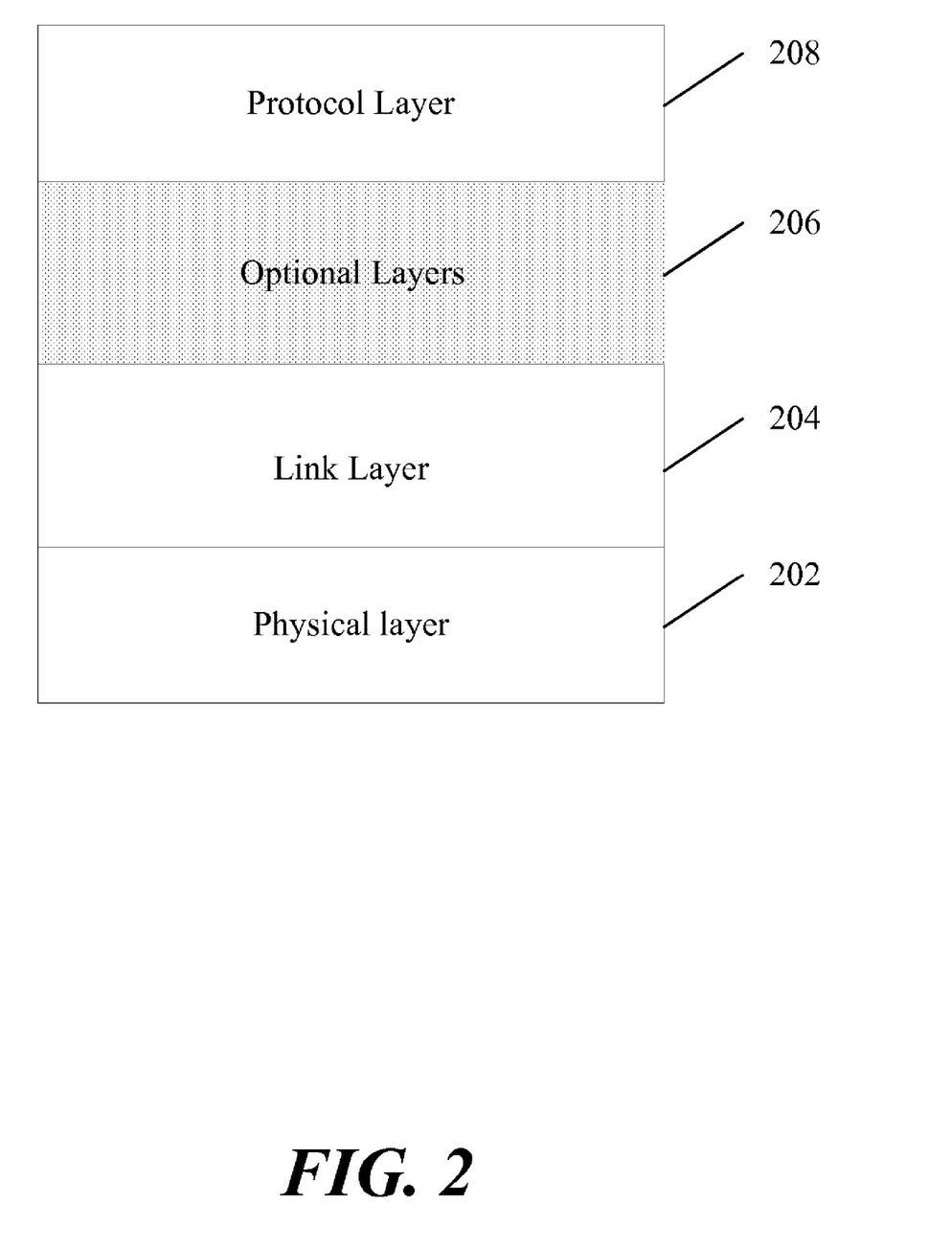
FIG. 2 is a block diagram illustrating the functional layers of a point-to-point interface.

FIG. 2 is a block diagram illustrating layers of the CSI interface. The functionality of CSI is partitioned into five layers, one or more of which may be optional for certain platform options. The layers illustrated in FIG. 2 include, from bottom to top, a physical layer 202 and a link layer 204. The CSI layers also include optional layers 206. Optional layers 206 include a transport layer and a routing layer. Finally, the layers include a protocol layer 208.

The physical layer 202 is responsible for electrical transfer of information between two CSI agents across the physical medium. For at least on embodiment, the physical link is a point-to-point link between the two CSI agents and uses a differential signaling scheme.

The link layer 204 abstracts the physical layer from the upper layers. For at least one embodiment, the link layer 204 provides for reliable data transfer and flow control between two directly connected CSI agents.

The transport and routing layers (see 206) are optional and are utilized for certain platform options only. For example the functionality of the routing layer may be embedded in the link layer for certain desktop, mobile and dual processor systems. Generally, the routing layer provides a flexible and distributed manner of routing CSI packets from a source to a destination and the transport layer provides support for end-to-end reliable transmission between two CSI agents that each have transport layer capability.

FIG. 2 illustrates that the top-most layer of the CSI point-to-point interface is the protocol layer 208. The protocol layer implements higher level communication between CSI nodes. The protocol layer may implement cache coherence, ordering, peer to peer I/O, and interrupt delivery.

Figure 3:
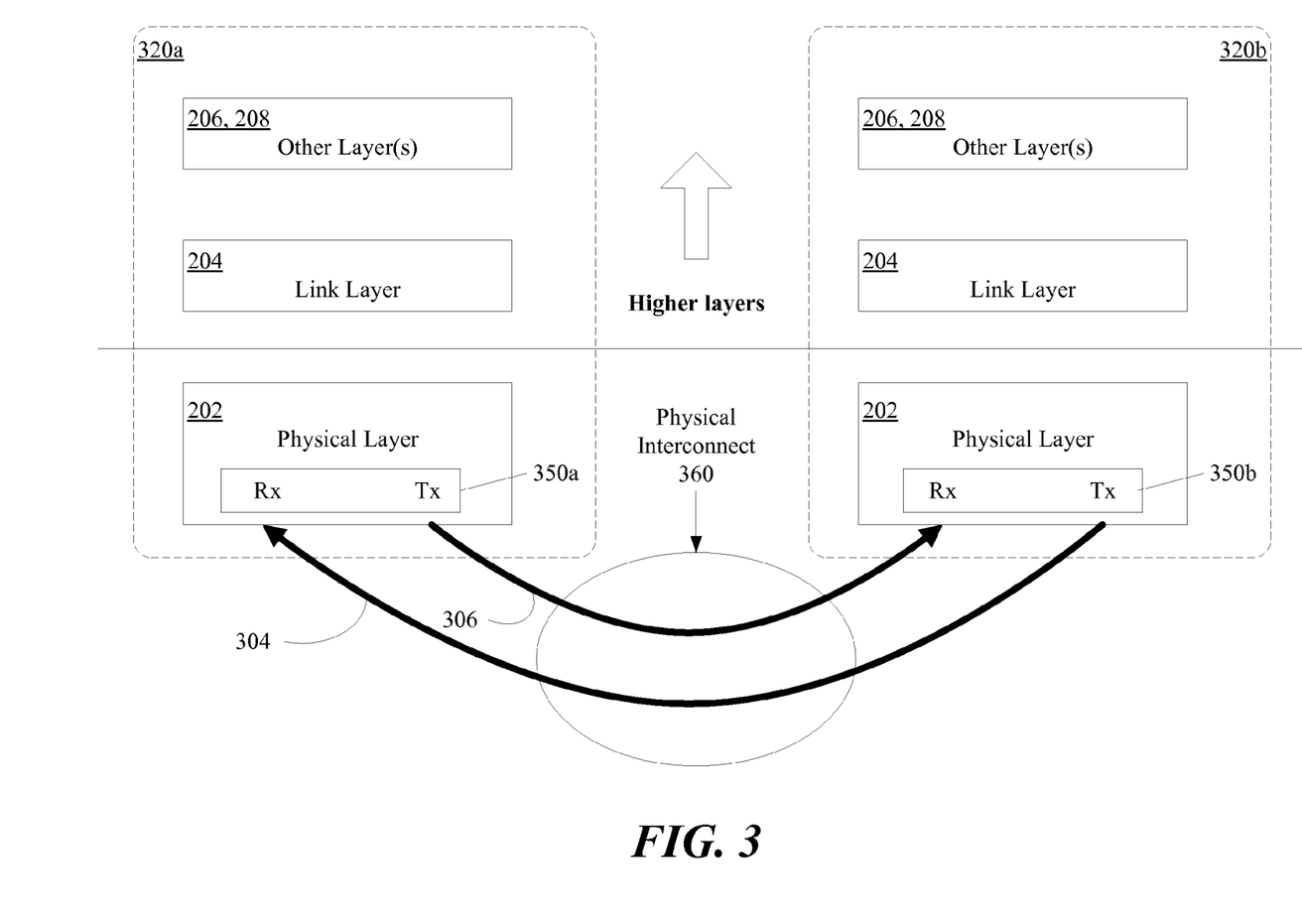
FIG. 3 is a block diagram illustrating at least one embodiment of a physical interconnect between ports of two agents.

FIG. 3 is a block diagram illustrating at least one embodiment of a physical interconnect 360 between the ports 350a, 350b, respectively, of two CSI agents 320a, 320b. Although FIG. 3 illustrates only one port 350 for each agent 320, one of skill in the art will recognize that each agent 320 may include additional ports (not shown). FIG. 3 illustrates that the physical layer 202 is responsible for providing a means of communication between the CSI ports 350 of each of the agents 320a, 320b. For at least one embodiment, one of the agents 320a may be a processor (such as processor 120 shown in FIG. 1) and the other agent 320b may be an I/O hub or chipset (such as chipset 140 shown in FIG. 1).

FIG. 3 illustrates that the physical interconnect 360 between two ports 350 includes two uni-directional links 304, 306. FIG. 3 illustrates that the unidirectional links include a transmit (Tx)—receive (Rx) link 306 going in one direction between the ports 350a, 350b and a Rx-Tx link 304 going in the other direction between the ports 350a, 350b.

As is stated above, each CSI agent 320 is host to one or more ports 350. As used herein, the term "port" may refer to one or more transceivers of an agent 320. For at least one embodiment, a transceiver is a transmit/receive (Tx, Rx) differential pair. For at least one embodiment, a differential pair is a pair of copper conductors that form a conduit for one bit of control/data or clock information; the pair of conductors may embody a differential signaling scheme For at least one embodiment, each of Tx and Rx differential pairs is thus utilized to transmit or receive a clock signal or 1 bit of control or data. For an embodiment wherein each of the Tx and Rx differential pairs represents a single bit of data, a port 350 may include enough Tx, Rx pairs (transceivers) to support the total number of bits defined for the physical interconnect 360.

Thus, for an embodiment wherein each link is defined to be 20 bits wide, for example, a port 350 may include 20 differential Tx pairs to send control/data in one direction, along with a differential Tx pair to carry the forwarded clock, and may also include 20 differential Rx pairs to receive control/data in the other direction, along with a differential Rx pair to receive the forwarded clock.

For at least one embodiment, a default link width is 20 bits wide. Such a link includes twenty Rx and Tx differential pairs to carry, in one direction, control/data and an additional differential pair to carry the forwarded clock in the same direction. The conduit from a local Tx or Rx differential pair of one agent, respectively, to a remote Rx or Tx differential pair, respectively, of another agent is referred to herein as a "lane."

For at least one embodiment, a link having 20 physical data/control lanes is referred to as a full width link. The physical lanes of a link may be configured to be inactive in order to facilitate a lesser-width link. That is, for an embodiment having 20-bit full-width links, a link may be configured in a half-width mode with 10 active lanes or in a quarter-width mode having 5 active lanes. In some such embodiments, there may be no requirement that the number of active links in each direction of a physical interconnect be configured with the same number of active lanes at a given time. For instance, a physical interconnect having a 20-lane uni-directional link in each direction may have one of the links configured to have 20 active lanes configured in one direction and 10 active lanes configured for the other direction.

Figure 4:
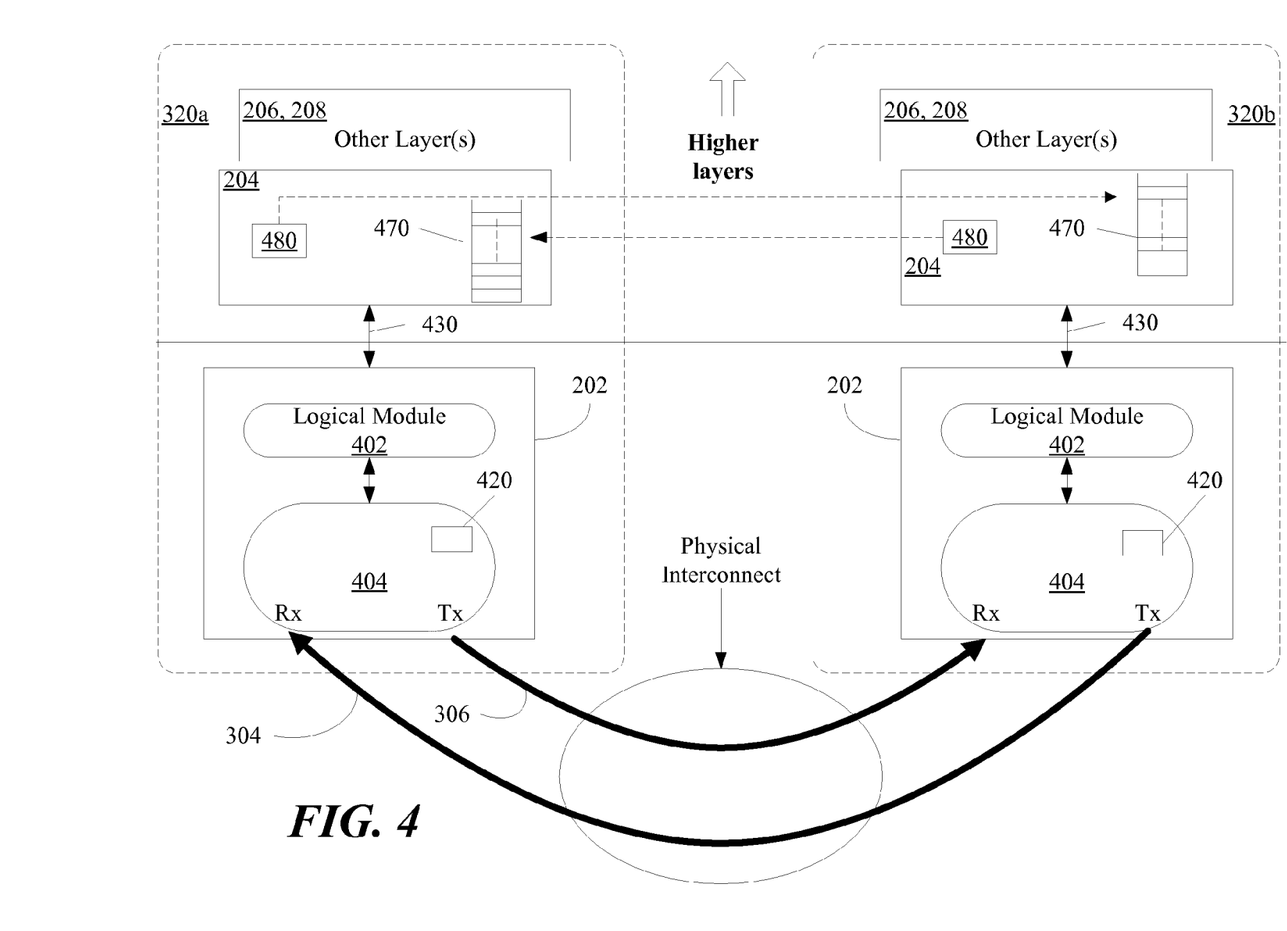
FIG. 4 is a block diagram illustrating details of the physical layer for at least one embodiment of an agent.

FIG. 4 is a block diagram illustrating further detail of the physical layer 202 for at least one embodiment of an agent 320. The physical layer 202 for each agent 320 directly interacts with only the link layer 204 of the same agent 320.

FIG. 4 illustrates that the physical layer 202 may be conceptualized as having two distinct blocks—a logical module 402 and an electrical module 404. During normal power state operation, the logical module 402 may act as a pass-through conduit for communication traffic to the link layer 204. The logical module 402 is responsible for initialization of the physical layer 202, and for providing physical layer test hooks and physical layer debug hooks.

The logical module 402 is also responsible, for at least one embodiment, for power management inside the physical layer 202. The logical module 402 may thus respond to requests to enter and exit low power states. For at least one embodiment, the logical module 402 communicates with link layer 204 to enter and exit low power states. The logical module 402 may include control logic to control the enabling/disabling of input-output (I/O) circuitry to enter and exit a low power state and to turn-on low power circuitry to maintain a link in a low power electrical idle state. The logical module 402 may also include control logic to resynchronize both CSI agents upon exiting from the low power state. The logical module 402 may also include control logic to control enabling and disabling of analog activity detectors 420 (described below).

At least one embodiment of the electrical module 404 is transparent to the link layer 204, and only interfaces with the logical module 404. The electrical module 404 includes a number of circuits, including front-end driver and receiver circuits, clock circuitry, and analog circuitry 420.

The link layer 204 and the logical module 402 of the physical layer 202 communicate over an interface 430. The interface 430 may include a transmit data path and control signals, as well as a receive data path in the opposite direction along with associated control signals. The control signals control data transfer between the link layer 204 and the physical layer 202.

The smallest unit of information transferred to/from the link layer 204 over the interface 430 is referred to as a "flit." In contrast, the smallest unit of data transferred from one agent to another at the physical layer 202 is referred to as a "phit." The transmit circuitry (Tx) for one agent sends phits over the link 304, 306 to the receive circuitry (Rx) of another agent. The link layer 204 relies on the physical layer 202 to frame one or more physical layer units of transfer (phits) into the link layer unit of transfer (flit) before such information is transferred over the interface 430.

The link layer 204 is responsible for reliable data transfer between 2 CSI agents 320. To this end, the link layer 204 maintains a retry buffer 470. Flits sent by one agent 320 to another agent 320 are buffered in the retry buffer 470 by the link layer 204 of the transmitting agent (assuming that such flits are retry-enabled). The retry buffer may be implemented for at least one embodiment as a first-in-first-out (FIFO) circular buffer. If the sending agent receives an indication from the receiving agent that an error occurred in the transmission of a flit, the buffered entry may be located in the retry buffer 470 and re-sent.

As is explained above, idle flits are sent across the link, during normal power operation, during times when the link would otherwise be idle. This is done to support proper operation of the link layer's 204 flow control and retry scheme. Conversely, not sending anything across the link during such times would, during normal power operation, result in arbitrary voltage on the link. Ordinarily, the receiver would try to translate such arbitrary voltage to some random combination of bits, which would then be forwarded to the link layer. The link layer may perceive these random bits as an unrecognized flit, hence a transmission error, and request a retry. Because the transmitter's retry buffer 470 would not have an entry corresponding to the retry request made by the receiver, the flow control mechanism would break down.

Sending idle packets, which are recognizable by link layer 204, avoids the above problem. However, it should be noted that idle packets do not carry any meaningful payload data, but still result in power consumption. Accordingly, the inventors have determined that, rather than consume power by sending idle flits during periods of link inactivity, power savings may be realized by putting the link into a low power state. For at least one embodiment, the flow control mechanism is suspended during the low power state, which is discussed in further detail below.

The physical layer-link layer interface 430 may also include a command/response ("Cmd/Rsp") interface via which the link layer 204 and physical layer 202 communicate commands. For example, the link layer 204 may instruct the physical layer 202 to enter the low power state using the Cmd/Rsp portion of the interface 430.

This low power state may be entered by one direction of the physical link, independent of the other direction (see 304, 306). During such low power state, referred to herein as L0s, portions of the electrical modules 404 of the agents 320a, 320b may be powered down. For at least one embodiment, the portions of the electrical modules 404 are powered down during L0s state according to a pre-determined policy, based on a configurable wakeup time value. For at least one embodiment, the logical modules 402 for each of the agents 320 remain powered on during the L0s state.

For the L0s state, the uni-directional links 304, 306 are placed in the Electrical Idle (EI) state, where both halves of a differential pair are driven to a common voltage value. For at least one embodiment, the EI state is maintained by driving both halves of the Tx differential pair to ground, although any voltage value may be selected.

Exit from L0s state is facilitated through activity detect analog circuitry on Rx differential pairs. This activity detect analog circuitry may constitute all or part of the analog circuitry 420 illustrated in FIG. 4. The activity detect analog circuitry 420 is turned on when the Rx side of a uni-directional link enters L0s state. In contrast, the activity detect analog circuitry 420 is not powered on during other operational states of the uni-directional link, including a normal power state. For at least one embodiment, turning off analog activity detectors during normal operation improves the receiver's noise margin. This, in turn, may allow the link to operate at higher frequencies.

While the activity detectors 420 are powered on during L0s state, they interpret a break from EI state on the Rx differential pair as an indication to exit the L0s state. Such break occurs when the transmit side of the uni-directional link breaks EI by driving the Tx differential pair to a predefined voltage value, such a voltage that represents logic 1. Of course, other voltage values may be utilized, such as. For example, a voltage value that represents logic 0.

The hierarchy of layers as shown in FIG. 2 and FIG. 4 should not be taken to be limiting. For instance, one or more embodiments may include the logical module 402 as part of the link layer 204 rather than part of the physical layer 202.

Also, although each agent 320 is illustrated in FIG. 4 as having only one port (i.e., one Tx-Rx pair), one of skill in the art will recognize that an agent 320 may include multiple ports.

Figure 5:
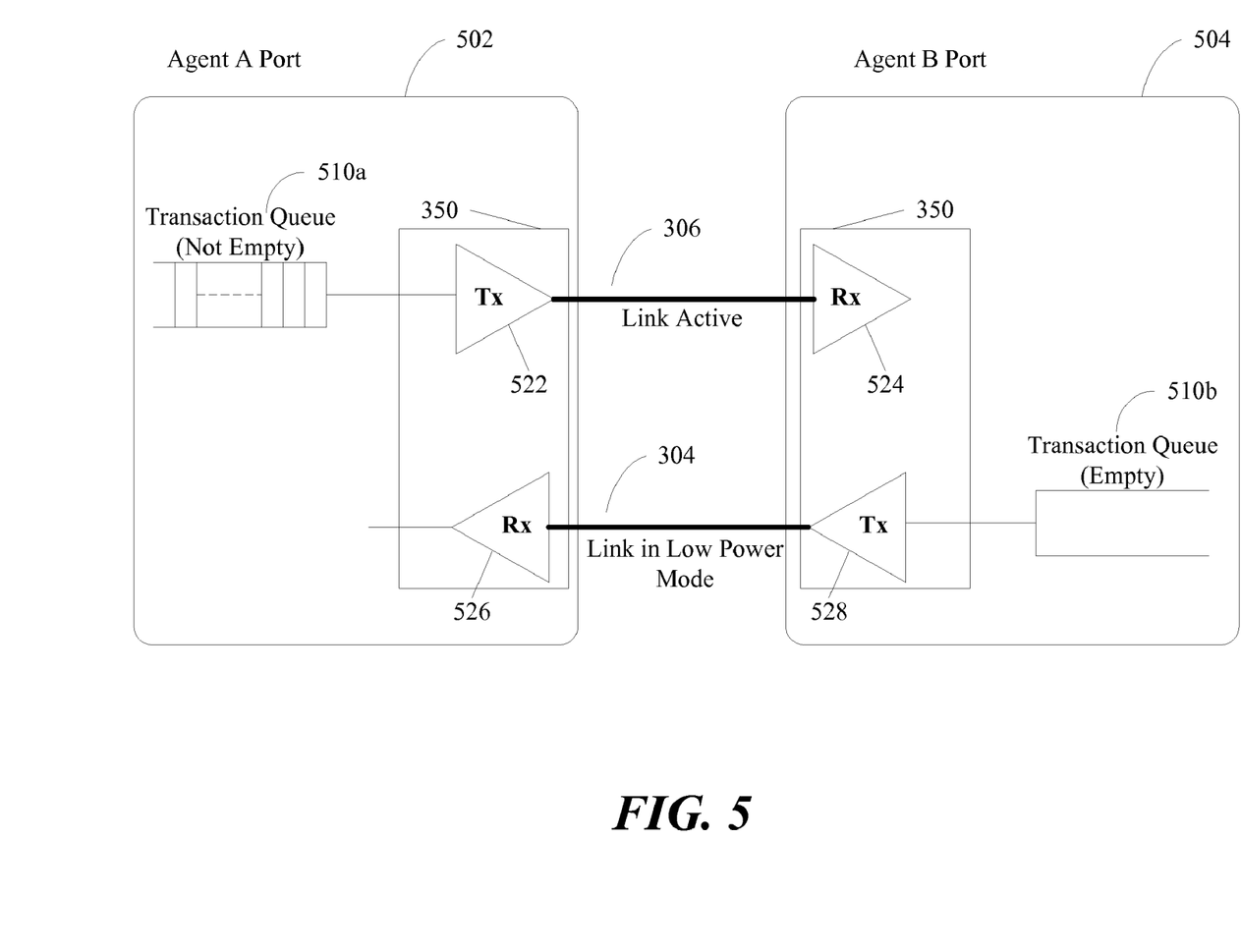
FIG. 5 is a block diagram illustrating two sample unidirectional links for a physical interconnect between two agents.

FIG. 5 is a block diagram illustrating two sample unidirectional links 304, 306 for a physical interconnect between the ports of two CSI agents 502, 504. For convenience, a first CSI agent 502 of FIG. 5 is referred to herein as Agent A and a second CSI agent 504 is referred to herein as Agent B. Although each Agent is illustrated as having a single port in FIG. 5, one of skill in the art will recognize that either or both of the Agents 502, 504 may include additional ports (not shown). FIG. 5 illustrates that, for at least one embodiment, one link 306 of a physical interconnect may remain active in a normal power state while the other link 304 of the physical interconnect is in the low power state.

FIG. 5 illustrates that entry into L0s low power state for a uni-directional link, such as link 304, may be triggered when an output transaction queue 510 associated with the link layer 204 (see FIG. 2) of the agent 504 is empty. If the transaction queue 510 for a port, such as the Agent B port, is empty, the Tx circuitry 528 for the agent sends an L0s-enter packet across the unidirectional link 304 to indicate that the Rx circuitry 526 for the other port, such as the Agent A port, should enter the low power state.

For each physical layer portion of a port 350, the Rx and Tx circuitry 522, 524, 526, 528 illustrated in FIG. 4 may include one or more differential pairs. For at least one embodiment, each such element 522, 524, 526, 528 includes 20 data/control lanes as well as a lane that carries the forwarded clock.

FIGS. 4 and 5 are referenced together for further discussion of the transaction queues 510a, 510b. For at least one embodiment, the link layer 204 performs the determination of whether a transaction queue 510 is empty. If a port detects an L0s-enter trigger condition, the link layer 204 (Tx) so indicates to the physical layer 202 (Tx) over the interface 430. The physical layer 202 may then initiate the L0s-enter packet on the link 304. The link layer 204 also sends an L0s-enter packet over the link 340, to indicate to the Rx port that L0s mode is desired. The link layer 204 (Rx) of the remote port, upon receiving L0s enter packet, may inform its physical layer 202 (Rx) to enter L0s state.

For at least one embodiment, the L0s-enter trigger condition may be satisfied when an agent detects that its transaction queue 510 contains less than a minimum number of packets awaiting transmission. For at least one other embodiment, however, the physical layer 202 may perform detection of an empty transaction queue 510. For other embodiments, detection of a trigger condition for entry of the L0s state may be performed in other manners that are triggered, for instance, by software or by power management processing.

Entry into the L0s low power state thus may be initiated when a trigger condition is met. For at least one embodiment, the trigger condition occurs when an agent's transaction queue 510 is empty. For other embodiments, different or additional conditions may trigger entry into L0s state.

Figure 6:
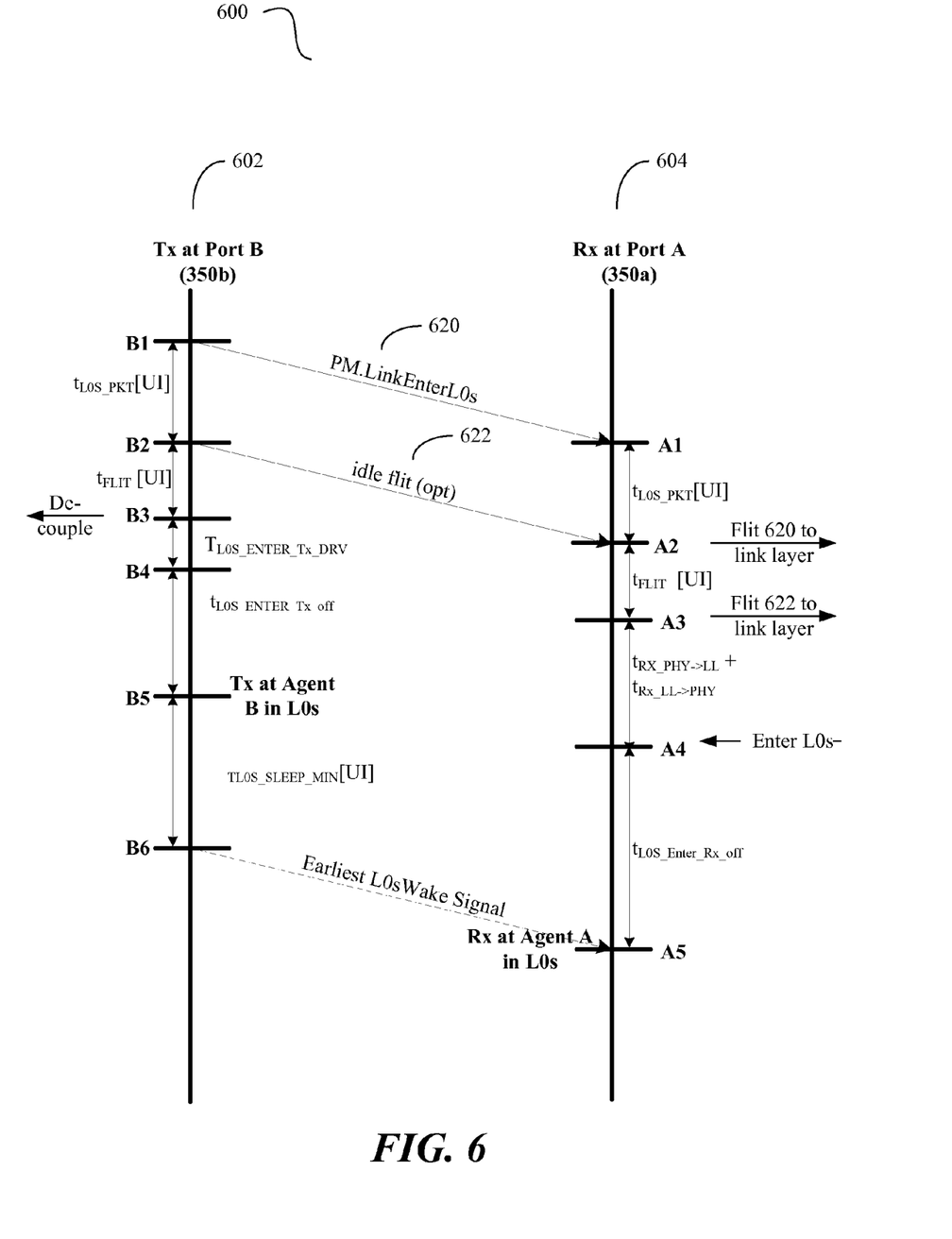
FIG. 6 is a timing diagram illustrating at least one embodiment of a method for entering into a low power state for a link of a physical interconnect.

FIG. 6 is a timing diagram illustrating at least one embodiment of a method for entering a low power state for a uni-directional link of a physical interconnect. FIG. 6 is discussed herein in conjunction with FIG. 4. FIG. 6 illustrates actions performed by both the Tx and Rx circuitry of a link. The actions taken by the Tx circuitry at the port 350 of Agent B are indicated on the first axis 602. The actions taken by the Rx circuitry of the port 350 of Agent A are indicated on the second axis 604. It is assumed for at least one embodiment that, prior to the actions described in connection with FIG. 6, the uni-directional link is in a normal operating state.

FIG. 6 illustrates that, at time B1, the transmitting agent, Agent B, begins sending the L0s-enter flit packet, which is designated as PM.LinkEnterL0s 620 in FIG. 6. The time interval between B1 and B2 is the time it takes to send all bits of the L0s-enter packet 620 across the physical link between Agent B and Agent A. This length of time may be represented by a timer, $t_{LOS\_PKT}$[UI]. Sending of the PM.LinkEnterL0s packet notifies the receiver that it should enter the low power mode. Such notification is thus achieved digitally, via transmission of packet data, rather than via utilization of analog activity detectors. As is explained in further detail below, analog activity detectors (see 420, FIG. 4) are not active during the normal operating state.

The timer $t_{LOS\_PKT}$ reflects the number of unit intervals (UI) required to transfer to the PM.LinkEnterL0s flit to agent A. This number depends on the link transfer ratio, discussed immediately below. As is mentioned above, the physical layer 202 (FIG. 4) transfers data on the link 304, 306 (FIG. 4) at a phit granularity. For at least one embodiment, a phit is 20 bits for a full-width link. A phit may be 10 bits for a half-width link and may be 5 bits for a quarter-width link. The time it takes to send one phit is referred to herein as a unit interval (UI).

The link transfer ratio is the number of phits per flit. For a full-width link that transmits 20 bits per UI, it takes 4 UI's to send an 80-bit four-phit flit. The transfer ratio is thus 4:1. Thus, for a full-width link, the value of $t_{LOS\_PKT}$ is four. However, for situations wherein the physical link is transmitting a half- or quarter-width number of bits per UI, the time to transmit the L0s-enter flit may, accordingly, take longer. For a half-width link that transmits 10 bits during each UI, the link transfer ratio for an 80-bit flit would be 8:1. Similarly, the link transfer ratio for an 80-bit flit would be 16:1 for a quarter-length (5-bit) link.

At time B2, Agent B may then begin sending an optional idle flit 622. For at least one embodiment, the idle flit 622 is not retry-enabled and carries no meaningful payload, but carries error detection information. For other embodiments, the error detection information carried by an idle flit 622 is not useful. For such embodiments, the idle flit 622 is optional.

The time interval between time B2 and time B3 represents the amount of time it takes to send the idle flit 622 over the physical link. This time interval is illustrated in FIG. 6 as time value, $t_{FLIT}$[UI]. The time value $t_{FLIT}$ reflects the actual number of unit intervals (UI) used to transfer to an idle flit to agent A. As with $t_{LOS\_PKT}$, the number reflected by $t_{FLIT}$ depends on the link transfer ratio.

After sending the idle flit 622, the link layer 204 at the Tx circuitry of the Agent B port 350b is decoupled from the physical layer 202 at the Tx circuitry of the Agent B port. As a result, the link layer 204 for Tx port of Agent B 350b will not initiate sending of any more flits over the link until the low power state is exited. Thus, flow control on the Tx side of link layer 204 is temporarily suspended, and the corresponding physical layer 202 of the Agent B port 350b is free to power down portions of its circuitry without interfering with the flow control mechanism.

For at least one embodiment, the decoupling is accomplished by turning off certain control signals of interface 430 (FIG. 4). For alternative embodiments, the decoupling need not be accomplished through an interface, such as interface 430 illustrated in FIG. 4. Instead, other mechanisms may be utilized so that the physical layer 202 can indicate to the link layer 204 that the control flow mechanism should be suspended. For example, the physical layer 202 and link layer 204 may communicate by storing and reading values in a common memory storage area.

At time B3, both the PM.LinkEnterL0s flit 620 and the optional idle flit 622, if utilized, have been fully transmitted to the receiving port 350a of Agent A. Thus, at time B3 the Tx port 350b for Agent B has sent all meaningful data used to notify the Rx port for Agent A that Agent A should enter the low power state. Theoretically, the Tx port for Agent B could transition into EI state at this time (B3). However, for at least one embodiment the Tx circuitry is not immediately powered down at time B3.

Abruptly transitioning to EI may degrade the signal quality of the last valid phit sent across the link. (The last valid phit may be the last phit of idle flit 622, if used, or may be the last phit of PM.LinkEnterL0s 620). The receiver may interpret the degraded signal as a transmission error. Thus, for at least one embodiment, Tx maintains a differential voltage between all its differential pairs for a period of time, $T_{LOS\_Enter\_Tx\_DRV}$, between B3 and B4.

As used herein, $T_{LOS\_Enter\_Tx\_DRV}$, as well as any other timer name beginning with an uppercase "T", may be a configurable timer value. Such configurable timer values may be maintained in one or more architecturally-visible control registers. For at least one embodiment, a predetermined value for such timers may be set by firmware or software. For at least one embodiment, the value $T_{LOS\_Enter\_Tx\_DRV}$ is configurable and may be expressed as UI, and thus can be programmed to suit link loss characteristics and link frequency.

At least one alternative embodiment may bypass the timing sequence between B3 and B4. Depending on the loss characteristics of the link and operating frequencies, it may not be useful, for some embodiments, to maintain differential swing during the time frame between B3 and B4.

At time B4, the transmitting agent, Agent B, begins entering L0s state itself. At this point, transition of the link to EI state is initiated and circuits in Tx portion of Port B begin to power-down. Accordingly, FIG. 6 illustrates that the time it takes for Agent B to begin entering L0s state, after L0s entry processing begins at time B1, can be determined as: $(t_{LOS\_PKT} + t_{FLIT} + T_{LOS\_Enter\_Tx\_DRV})[UI]$.

After Agent B begins powering down circuitry at time B4 in order to enter the low-power state, it takes some amount of time for the power-down to occur. FIG. 6 illustrates that this time, between B4 and B5, may be reflected as a time value, $t_{LOS\_Enter\_Tx\_off}$, which indicates the time required for Port B to turn off the desired portion of its electrical module 404 and complete its transition to EI state. Exactly which portions of the electrical module 404 are to be turned off is driven by the current value of a wakeup timer, which may be configurable. That is, only those portions of the electrical module 404 are turned off during the interval between B4 and B5 that can be subsequently powered back on within the current value for the L0s wakeup timer, $T_{LOS\_WAKE}$ (see FIG. 7). At time B5, all desired Tx circuitry for the Agent B port is now powered down (such that the link is in the EI state); the Tx portion of the port 350b at Agent B is now in the L0s state.

For at least one embodiment, the L0s wakeup timer, $T_{LOS\_WAKE}$, is a configurable timer that is maintained in an architecturally-visible control register. For at least one embodiment, the value for the timer may be set by firmware on both link ports prior to entering L0s state. As is stated above, all timers discussed herein that follow the nomenclature of beginning with an uppercase T may be similarly configurable. For alternative embodiments, however, one or more of such timers may be, rather than configurable values, constant values. For example, such timer values may be built in as power-on default values.

The wakeup timer $T_{LOS\_WAKE}$ may be utilized to provide flexible power consumption control. As is stated above, this timer may be used to determine which of the electrical module portions to turn off during L0s state. Only those portions that can meet the desired latency, as reflected by the wakeup time value in $T_{LOS\_WAKE}$, when transitioning back to an on state from an off state are turned off during L0s.

It should be noted that Port A and Port B do not necessarily initiate entering L0s at the same time. The different may be due to, for at least one embodiment, the non-zero time it takes the L0s information to be received by Port A. As such, at least one embodiment provides that Port B stays in L0s for a minimum amount of time, $T_{LOS\_SLEEP\_MIN}$, before it may start exiting out of L0s into normal link state. The value of $T_{LOS\_SLEEP\_MIN}$ timer is governed by the following equation:

$T_{LOS\_SLEEP\_MIN}$=max value of $t_{Rx\_PHY->LL}$+max value of $t_{Rx\_LL->PHY}$+max value of $T_{LOS\_Enter\_Rx\_off}$−$T_{LOS\_ENTER\_Tx\_DRV}$−min value of $t_{LOS\_Enter\_Tx\_off}$ $T_{LOS\_SLEEP\_MIN}$ is a constant timer value that the physical layer 202 receives from an external source. The nature of this timer as an externally-generated parameter is denoted by the uppercase "T" of its label. FIG. 6 illustrates, then, that $T_{LOS\_ENTER\_Tx\_DRV}$ is also an externally-generated constant timer value. $T_{LOS\_ENTER\_Tx\_DRV}$ indicates the number of UI during which the Tx side of the link should drive the Tx differential pairs high after transmitting the last flit prior to entering L0s state.

For at least one embodiment, they physical layer 202 expects these externally-provided timer values, along with the current L0s-wakeup timer discussed above, to be loaded into one or more architecturally-visible control registers by a higher layer before entry into L0s state is initiated. In contrast, other time values, denoted with labels having a lowercase "t", are internal circuit variables.

On the Rx side, FIG. 6 illustrates actions of the Rx circuitry of the Agent A port at axis 604. FIG. 6 illustrates that, at time A1, Agent A begins receiving the first phit of the PM.LinkEnterL0s flit 620. The timer discussed above, $t_{LOS\_PKT}[UI]$, represents the time it takes for the entire flit 620 to be received. For at least one embodiment, as is discussed above, the time represented by $t_{LOS\_PKT}$ may be four for a link operating at full width.

At time A2, the Rx circuitry has completed reception of the PM.LinkEnterL0s flit 620. For embodiments the employ the idle flit 622, Rx circuitry begins receiving the first phit of the optional idle flit 622 at time A2. Again, the time value, $t_{FLIT}[UI]$ represents the time for the idle flit 622 to be received by Agent A. This time value, for at least one embodiment, is four UI for a link operating in full-width mode. For at least one embodiment, reception of the idle flit 622 is complete at time A3.

FIG. 6 reflects that, at time A2, the physical layer of the Rx circuitry for the Agent A port has fully received the first flit 620 and may begin sending such packet to the link layer 204 (FIG. 4) over the interface 430 (FIG. 4). [It will be noted that the physical layer accumulates all phits of a flit before forwarding, at flit granularity, data to the link layer 204 (FIG. 4)] Thus, FIG. 6 illustrates that the first flit 620 may be sent to the link layer 204 while, at the same time, the physical layer may be receiving the second flit 622. Such parallel processing may proceed in a pipelined fashion.

At time A3, the Rx circuitry has competed receipt of the optional second flit 622. Thus, at time A3 the physical layer may send the second flit 622 to the link layer 202 (FIG. 4) over interface 430 (FIG. 4). As is stated above, the flit 622 is transmitted on flit granularity after its last phit has been received. A time value, $t_{Rx\_PHY->LL}$, represents the internal delay for the flit to reach the link layer 204 (FIG. 4) of Agent A from the physical layer 202 (FIG. 4). A second time value, $t_{RX\_LL->PHY}$ the time for the link layer 204 (FIG. 4) at Agent A to notify the physical 202 layer to enter L0s state, and for the signal to reach the physical layer 202.

In the meantime, the link layer 204 (FIG. 4) may have already received the PM.LinkEnterL0s flit 620 that was transmitted to it at time A2. To avoid false advancement of pointers, the link layer may disable advancement of its buffer pointer 480, since no further flit transmissions will be initiated by the Tx circuitry of the transmitting agent during L0s state. This halting of the advancement of the local buffer pointer 480 is performed despite that the fact that the link layer 204 (FIG. 4) has not yet informed the physical layer 202 that it should enter L0s state.

FIG. 6 thus illustrates that, during L0s, the link layer 204 disables advancement of the local buffer pointer 480 for the Rx side of the Agent A port. However, the advancement of its index into the retry buffer 470 for the Tx side of the Agent A port may remain active, since only one uni-directional link of the physical interconnection between Agents A and B is entering L0s state.

At time A3, the link layer 204 for the port 350 at Agent A has been notified, via receipt of the PM.LinkEnterL0s flit 620 (and, optionally, idle flit 622) to enter the L0s state. Beginning at time A3, the link layer ignores all subsequent flits until link exits from L0s back to the normal state. Between time A3 and A4, the physical layer 202 is unaware that the link layer 204 has received a notification to enter L0s state. Thus, the physical layer 202 may continue to send flits to the link layer 204. However, because the link is in EI state between A3 and A4, the flits sent by physical layer 202 are not meaningful. The link layer 204 ignores transmission of such non-meaningful flits.

Between time A3 and A4, the link layer 204 for the Rx port of Agent A indicates to the physical layer 202 that it should enter L0s. This may be accomplished by turning off certain control signals of interface 430. Alternatively, other manners of communication between the physical layer 202 and physical layer 204 may be employed, such as the common storage area approach discussed above.

At time A4, the receiving agent, Agent A, begins entering L0s state. Accordingly, FIG. 6 illustrates that the time it takes for Agent A to begin entering L0s state, after it begins receiving the first L0s-entry phit at time A1, can be determined as: $(t_{LOS\_PKT}+t_{FLIT}+t_{Rx\_PHY->LL}+t_{Rx\_LL->PHY})[UI]$.

At time A4, the physical layer 202 for the Rx port of Agent A knows that it should enter L0s and hence stops sending non-meaningful flits to the link layer 204. Thus flow control is temporarily disabled starting at time A4. As is discussed below, flow control may be reestablished by turning on the disabled control signals on the interface 430 when the Rx port for Agent A exits L0s. Re-establishing such control signals indicates to the link layer 204 on Port B that the link layer 204 resume accepting flits. Again, alternative schemes may be used to communicate between the physical layer and the link layer that the flow control mechanism should be re-established.

During the time frame between A4 and A5, the physical layer 202 for Agent A begins to power down portions of its Rx circuitry. FIG. 6 illustrates that the time between A4 and A5 may be reflected in a timer, $t_{LOS\_Enter\_Rx\_off}$, which indicates the time required for Port A to turn off the desired portion of its electrical module 404.

Exactly which portions of the electrical module 404 to be turned off is driven by the current value of the configurable wakeup timer. That is, only those portions of the electrical module 404 are turned off during the interval between A4 and A5 that can be subsequently powered back on within the current value for the configurable L0s wakeup timer, $T_{LOS\_WAKE}$. As is stated above, for at least one embodiment the current value for the configurable L0s wakeup timer is maintained in a control register and may be set by firmware on both link ports prior to entering L0s state. For at least on embodiment, control logic of the logical module 402 selects the portions to be powered down, based on the wakeup time value reflected in $T_{LOS\_WAKE}$.

At time A5, the Rx side of the port for Agent A is in L0s state. Tx differential pairs of the link are being driven to EI state and the desired Rx circuitry has been powered down. If the Tx differential pairs were to break electrical idle, the powered-down circuitry on the Rx side would not detect the break.

Accordingly, between times A4 and A5 the analog activity detector 420 is turned on in order to detect a subsequent transition out of L0s state.

Time A5 represents the earliest time that Rx circuitry of the A-side port of the link could respond to a wake up signal from Agent B. As is discussed above, the $T_{LOS\_SLEEP\_MIN}$ timer is utilized to prevent Agent B from sending such a wake up signal until Agent A has fully entered L0s state.

For at least one embodiment, the activity detectors 420 that have completed powering up by time A5 monitor activity on the link to detect a break from Electrical Idle. An analog activity detector 420 for each of the Rx differential pairs of the B-side port may be turned on. For an alternative embodiment, activity detectors 420 are turned on only for one or more selected Rx differential pairs. To detect a transition out of the electrical idle state, the analog activity detectors 420 monitor for differential voltage on the Tx lanes.

Figure 7:
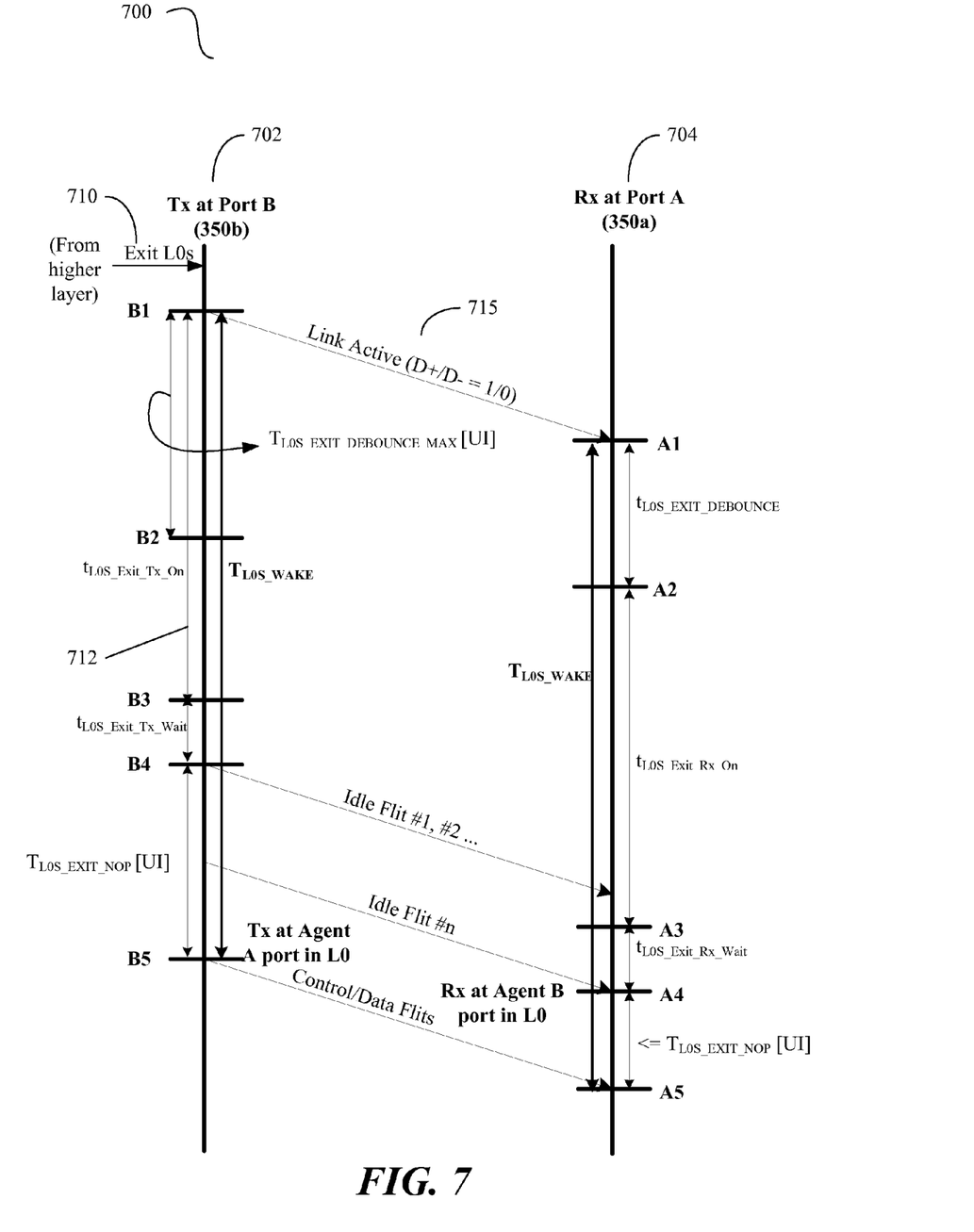
FIG. 7 is a timing diagram illustrating at least one embodiment of a method for exiting from a low power state for a link of a physical interconnect.

FIG. 7 is a timing diagram illustrating at least one embodiment of a method for exiting from a low power state for a uni-directional link of a physical interconnect. FIG. 7 is discussed herein in conjunction with FIGS. 4 and 6. FIG. 7 illustrates actions performed by both the Tx and Rx circuitry of a link. The actions taken by the Tx circuitry at the port 350 of Agent B are indicated on the first axis 702. The actions taken by the Rx circuitry of the port 350 of Agent A are indicated on the second axis 704.

The exit mechanism illustrated in FIG. 7 uses an analog activity detection scheme (see analog activity detectors 420 for Agent A). FIG. 7 assumes that, prior to time B1, Agent A 320a (FIG. 4) and Agent B 320b (FIG. 4) are in L0s state, such that selected portions of Tx circuitry of the Agent B port 350b and selected portions of Rx circuitry of the Agent A port 350a may be powered down. It is also assumed that the Tx-Rx link between such respective ports 350b, 350a of Agents B and A is in EI state. FIG. 7 also assumes that the analog activity detectors 420 for Rx circuitry of Agent A have been turned on.

Generally, the L0s state exit policy is based on a predetermined wake-up timer, $T_{LOS\_WAKE}$, which is discussed above. The $T_{LOS\_WAKE}$ timer is common to both ports of the link, and may be programmed into a control register by a layer above the physical layer 202. (For alternative embodiments, of course, the $T_{LOS\_WAKE}$ timer value may be a constant value rather than a programmable value, or may be a self-generated value internal to the physical layer 202.) According to at least one embodiment of the L0s state exit policy, both ports are required to wake up their powered-down electrical module 404 circuitry within the time specified by the $T_{LOS\_WAKE}$ timer. Several predetermined wakeup values may be defined in an alternative embodiment that provides varying levels of wakeup speed. The appropriate one of the plurality of wakeup values may be selected to achieve the desired wakeup speed.

To initiate re-entry into a normal operating state, referred to herein as L0 state, a higher layer, such as the link layer 204, sends an L0s exit signal 710 to the Tx port of the sleeping link.

The sending of such exit signal may be triggered upon occurrence of a trigger condition. For at least one embodiment, for example, sending of the L0s exit signal 710 may be triggered when a flit is entered, or about to be entered, into the transmitting agent's output transaction queue 510b. For an alternative embodiment, the trigger condition may be satisfied when a threshold number of flits have been entered into transaction queue 510b. For other embodiments, other trigger conditions may be utilized, including those triggered by software, a platform signal, a power management event, or the like. FIG. 7 illustrates that, in response to the L0s exit signal, Tx side of the link then initiates the L0s exit sequence.

At time B1 the physical layer 202 of Agent B signals the physical layer 202 of Agent A to exit L0s state. Tx differential pairs of the port 350 for Agent B thus break the electrical idle state on the lanes they are driving. That is, each of the Tx differential pairs begins driving its signals such that the expected differential voltage exists between each of its two lines. FIG. 7 illustrates that, for at least one embodiment, a value of logic "1" is driven on the differential pairs, such that the D+ voltage is at a high value (binary 1) and the D− voltage is at a low value (binary 0). In an alternative embodiment, different values may be driven on the differential pair, such as D+=binary 0 and D−=binary 1. Any values that produce the expected voltage differential may be employed.

In addition, at time B1 the physical layer 202 of Agent B starts waking up the powered-down portions of its electrical module 404.

The analog activity detectors 420 for the Rx pairs of Agent A will eventually recognize the break from electrical idle that is being driven on the Tx lanes of the link. For at least one embodiment, it is difficult to predict precisely how long it will take for the activity detectors 420 to detect and recognize the break from electrical idle. Being analog in nature, the time required to detect a differential swing is expected to vary among activity detectors 420. Such variability may be caused by one or more factors, including (but not limited to) operating conditions like voltage and temperature as well as and manufacturing process variations among different components. Despite this variability, it is possible to predict the minimum and maximum debounce time required by activity detectors 420 to sense a break from electrical idle.

For at least one embodiment, a configurable timer $T_{LOS\_EXIT\_DEBOUNCE\_MAX}$ is used to indicate the maximum debounce time for the analog activity detectors 420. As is discussed above, the use of an uppercase "T" in the label of this timer indicates that at least one embodiment of $T_{LOS\_EXIT\_DEBOUNCE\_MAX}$ is a timer value that the physical layer 202 receives from an external source. For other embodiments of course, the timer value may be internally calculated by the physical layer 202 or may be received as a power-on default value.

For at least one embodiment, the value of $T_{LOS\_EXIT\_DEBOUNCE\_MAX}$[UI] reflects the maximum debounce time, expressed in terms of UI, required by the activity detectors on the Agent A port to detect the break from the electrical idle state. For at least one embodiment, such value reflects the maximum value taking into account possible process, voltage and temperature variations.

Thus, time A2 reflects the latest time at which the Rx activity detectors will have detected and recognized the break from electrical idle 715 that began transmitting at time A1. This break indicates an L0s exit condition. At time A2, however, the electrical module 404 circuitry for Tx at the port 350b for Agent B may not have fully powered up. FIG. 7 illustrates an embodiment wherein Tx takes longer to wake up its electrical module 404 circuitry than it takes for Rx's activity detectors 420 to recognize the wakeup signal. Tx circuitry at Port B 350b drives a differential swing for at least a time period of $T_{LOS\_EXIT\_DEBOUNCE\_MAX}$. For at least one embodiment, a differential swing is maintained on all differential pairs of Tx until time B4.

For other embodiments, the Tx electrical module may fully power up before the Rx activity detectors recognize the break from electrical idle. For either embodiment, time B3 reflects the time at which a) Tx electrical module 404 circuitry is fully awake and b) Rx activity detectors 420 have had the maximum required time to receive and recognize the wakeup signal.

FIG. 7 illustrates that the time frame indicated by the arrow 712 between times B1 and B3 represent the time it takes for Agent A to fully power back up those portions of the electrical module 404 that were powered down during the L0s state. This time is indicated by $t_{LOS\_Exit\_Tx\_On}$, whose value reflects the time taken by the port at Agent B to turn on its electrical module 404. The time $t_{LOS\_Exit\_Tx\_On}$ may be calculated as $t_{LOS\_Exit\_Tx\_On} <= T_{LOS\_WAKE} - T_{LOS\_EXIT\_DEBOUNCE\_MAX} - T_{LOS\_EXIT\_NOP}$. From this equation, it can be noted that Tx at Port B 350b selects portions of its circuits to be powered-off, upon entering L0s, such that these powered-down circuits can be powered-on within a time period of $t_{LOS\_Exit\_Tx\_On}$.

At time B3, the physical layer at the Agent B port for the formerly sleeping link is fully "awake." However, before Agent B resumes transmission of phits across the link to Agent A, certain synchronization actions should take place. Such synchronization actions are discussed immediately below. However, it should be noted that the embodiments discussed herein do not require a full re-initialization of the physical layer 202 when exiting the L0s state because the internal logic continues to maintain flit boundaries during L0s state. In contrast to other protocols which may require, at the least, a fast training sequence upon exit of L0s state in order to retrain the physical layer, the two synchronization actions discussed below are relatively fast. While synchronization sequences for physical layer re-initialization for other protocols may require relatively large time periods, the synchronization actions discussed below may require, for at least one embodiment, only about five nanoseconds.

The first synchronization action occurs between times B3 and B4. During this time, an internal delay is imposed in order to ensure that the first phit transmitted by Tx after exiting L0s state is on a flit boundary. That is, if B3 occurs outside a flit boundary, Tx waits until the next flit boundary before beginning to send phits to the Rx circuitry of the Agent A port. The time $t_{LOS\_Exit\_Tx\_Wait}$ reflects the amount of time that the port of Agent A waits until the next flit boundary.

Implicit in the preceding paragraph is the fact that, for at least one embodiment, the physical layer for the Tx circuitry of Agent A includes hardware counters that remain active even when other circuitry of the physical layer 202 has been powered down during L0s state. During normal operation, Tx sends the phits for a full flit packet at certain intervals. For example, if the width of the link is 20 bits, and the link layer (204) is transmitting 4-phit flit packets (80 bits), then it takes four cycles to transmit each flit. Thus, we say that the flit boundary occurs every four cycles. Thus, during normal operation transmission of the first phit of a flit is initiated at a four-cycle "flit boundary." Data from the hardware counters may be utilized to track flit boundaries. Rather than being limited to a counter, flit boundaries may be tracked by any type of indicator.

Thus, between times B3 and B4 a first synchronization action takes place—transmission of the first phit is delayed so that it will occur on a proper flit boundary, as measured by hardware flit boundary indicators that are allowed to continue running during the L0s state.

At time B4, then, the Tx circuitry of the physical layer for Agent B is powered up and is on a proper flit boundary. This is the earliest time physical layer can begin transmitting flits from the link layer 204. However, the time period between B1 and B4 is still less than $T_{LOS\_WAKE}$. Hence, the physical layer for Agent B does not yet send any control/data flits from link layer 204, but may send idle flits.

This period of sending idle flits from times B4 to B5 represents the second synchronization action. This time period accounts for the variability in activity detector debounce time at the receiver. During this time, idle flits are sent from Tx of Agent B to Rx of Agent A until both Agent B and Agent A are "synchronized" in the sense that both have fully exited the L0s state and are operating normally in the L0 state.

FIG. 7 illustrates that the length of the synchronization period between B4 and B5 is indicated by a configurable timer, $T_{LOS\_EXIT\_NOP}$. This timer indicates the minimum amount of time, expressed in UI, that idle flits should be sent during the second synchronization action. For at least one embodiment, the value of $T_{LOS\_EXIT\_NOP}$ is arrived at by estimating the difference between the minimum and maximum wakeup times for the Rx analog activity detectors. Such value may be derived, for example, by estimating the maximum debounce value, $T_{LOS\_EXIT\_DEBOUNCE\_MAX}$, across all processes, voltage and temperature (PVT) variations and then determining the maximum variance in the maximum debounce time across PVT. Similarly, a minimum debounce value, $t_{LOS\_EXIT\_DEBOUNCE\_MIN}$, may be determined.

At time B5, the port on the Tx side of the link is in the L0 state and has sent idle flits long enough to satisfy the desired wakeup time value, $T_{LOS\_WAKE}$. At this time, the Tx circuitry of Agent B begins sending actual flits as requested by the link layer 204. Also, the physical layer 202 may turn on some control signals on interface 430 to indicate to link layer 204 that the former is ready to accept and transmit flits from the latter.

On the Rx side, FIG. 7 illustrates on axis 702 that, at time A1, the activity detectors 420 of the Agent A physical layer 202 start sensing that the link has transitioned from electrical idle to an active state. After expiration of the actual analog activity detector debounce time, $t_{LOS\_EXIT\_DEBOUNCE}$, the Rx portion of the port at Agent A starts waking up its circuitry at time A2. The time reflected by $t_{LOS\_EXIT\_DEBOUNCE}$ in FIG. 7 represents the time actually taken by the Rx activity detectors 420 to sense the link active state. This actual value will be between the estimated $T_{LOS\_EXIT\_DEBOUNCE\_MAX}$ and $t_{LOS\_EXIT\_DEBOUNCE\_MIN}$ values discussed above. At time A2, the Rx activity detectors 420 are turned off.

At time A3, the Rx portion of the port at Agent A has completed waking up the electrical module 404 circuitry that was previously shut down upon entry to L0s state. The interval between times A2 and A3, represented as $t_{LOS\_Exit\_Rx\_On}$, reflects the time permitted for Rx to power up the electrical module 404 circuitry. The time $t_{LOS\_Exit\_Rx\_On}$ may be calculated as $T_{LOS\_WAKE} - T_{LOS\_EXIT\_DEBOUNCE\_MAX}$.

One will note that FIG. 7 illustrates that some idle flits may be sent by Tx at Agent B before Agent A has reached time A3. In other words, some idle flits may be received by Agent A before the Rx circuitry has fully powered up and entered L0 state. This is acceptable; such flits are ignored by Rx. Such approach does not cause errors, since the flow control mechanism for Agent B does not, for at least one embodiment, expect an acknowledgment for idle flits.

FIG. 7 illustrates that the first synchronization action (synchronization onto flit boundaries) mentioned above is also taken for Rx circuitry. At time A3, the Rx circuitry for the Agent A port has fully powered up and is ready to enter the L0 state. Assuming that A3 does not occur on a flit boundary, the port waits until the next flit boundary before entering L0 state. FIG. 7 illustrates that the delay to accomplish the flit boundary synchronization for Agent A is reflected by $t_{LOS\_Exit\_Rx\_Wait}$. Thus, at time A4 the Rx circuitry for the Agent A port is now synchronized to a flit boundary.

At time A4 the Rx circuitry for the Agent A port has fully entered L0 state. At such time, the physical layer 202 at Agent A turns on one or more control signals on interface 430, begins receiving phits sent by the Agent B port, and begins forwarding flits to the link layer 204. FIG. 7 illustrates that, prior to this time, the Rx circuitry may have missed the first (N−1) idle flits. It is thus important that the number of idle flits (N) be correctly calculated by Agent B such that the first non-idle flit arrives at the Rx circuitry of the Agent A port no earlier than time A4. For at least one embodiment, the number, N, of idle flits to be transmitted by Tx at Agent B between times B4 and B5 is calculated based on the value of $T_{LOS\_EXIT\_NOP}$, discussed above. At time A4, the Rx side of the Agent A port is in the L0 state and may now forward flits to the link layer at Agent A.

For some period of time between A4 and A5, the Tx circuitry at the Agent A port may continue to receive idle flits and forward these idle flits to the link layer 204. The time $<=T_{LOS\_EXIT\_NOP}[UI]$ may thus reflect the duration for which the physical layer at Agent A receives idle flits and forwards them to the Agent A link layer.

FIG. 7 illustrates that a configurable timer, $T_{LOS\_WAKE}$, reflects that total time that each of Rx and Tx are permitted in order to complete their wakeup sequence. As is stated above, the current value for at least one embodiment of this timer is set in a control register by a layer higher than the physical layer 202. For at least one embodiment, for example, this constant value is set by the BIOS (basic input/output system). As is discussed above, this timer value is also utilized during the L0s-entry processing illustrated in FIG. 6 to determine which portions of the Rx and Tx electrical modules 404 to power down during the L0s state. For at least one embodiment, only those circuits that can be powered back up within the time frame indicated by $T_{LOS\_WAKE}$ are powered down during FIG. 6 processing.

In summary, described above are a method 600 for placing a link of a physical interconnect into a low power state and a method 700 for exiting the low power state. During the low power state, both signals for a differential pair of the link are placed into Electrical Idle state. For at least one embodiment, the low power state (L0s) is entered when an output transaction queue for a transmitter is empty. A low power packet is sent from the transmitter to the receiver to instruct the receiver to enter the low power state. No handshake is expected from the receiver, reducing the time needed to enter the low power state. Upon entering the low power state, the receiver turns on analog activity detectors that are used to detect activity on the link.

The discussion above further discloses, in summary, that responsive to a trigger event, the transmitter signals the receiver to wake up from the low power state by creating a predefined activity on the link. For at least one embodiment, the predefined activity is a break from Electrical Idle, a condition marked by a differential voltage across a differential pair that is large enough to be sensed by activity detectors on the remote agent. This predefined activity is detected by the analog activity detectors, which then wake up the receiver from the low power state.

Both the transmitter and receiver maintain internal hardware flit boundaries during the low power state. Accordingly, re-activation of the link from low power state does not require re-initialization of the link layer. Accordingly, the low power state may be exited without requiring a physical layer synchronization training sequence, such as that performed by other protocols, such as PCI-Express, upon exit from a low-power state. Eliminating the need for physical layer re-initialization allows for reduced wake-up latency in terms of the time required to exit L0s mode and begin sending/receiving transmissions over the link.

Embodiments of the methods disclosed herein may be implemented in hardware, software emulation, firmware, or a combination of such implementation approaches. Embodiments of the disclosed methods might be performed by specific hardware components that contain hardwired logic for performing the methods, or by any combination of programmed computer components and custom hardware components.

Software emulation embodiments of the methods may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this disclosure, a processing system includes any system that has a processor, such as, for example; a network processor, a digital signal processor (DSP), a microcontroller, an application specific integrated circuit (ASIC), or a microprocessor.

Software emulation embodiments may be provided as a computer program product which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

In the preceding description, various aspects of an apparatus, system and methods for performing dynamic management of a compiled code region are disclosed. For purposes of explanation, specific numbers, examples, systems and configurations were set forth in order to provide a more thorough understanding. However, it is apparent to one skilled in the art that the described method and apparatus may be practiced without the specific details. It will be obvious to those skilled in the art that changes and modifications can be made without departing from the present invention in its broader aspects.

While particular embodiments of the present invention have been shown and described, the appended claims are to encompass within their scope all such changes and modifications that fall within the true scope of the present invention.

What is claimed is:

1. A system comprising:
a processor having a point-to-point interface port; and
a chipset having a point-to-point interface port;
wherein said processor port and said chipset port are coupled together via a physical interconnect, the physical interconnect comprising two unidirectional links;
wherein the physical interconnect and the ports are to support a low-power state on one of the unidirectional links and are to concurrently support a normal power state on the other link;
wherein exit from the low-power state does not require a physical layer re-initialization sequence.

2. The system of claim 1, wherein:
the processor includes a memory controller; and
the chipset is an input/output controller.

3. The system of claim 1, wherein:
the ports and the physical interconnect are further to support exit from the low power state within a configurable wakeup time.

4. The system of claim 1 further comprising:
a memory system.

5. The system of claim 4, wherein:
the memory system further comprises a DRAM.

6. The system of claim 1, wherein:
the processor further comprises an analog activity detector to detect a break from an electrical idle state on one of the links when the link is in the low power state.

7. The system of claim 6, wherein:
the processor is further to power down analog activity detector when the link is in the normal power state.

8. The system of claim 1, wherein:
the chipset further comprises an analog activity detector to detect a break from an electrical idle state on one of the links when the link is in the low power state.

9. The system of claim 8, wherein:
the chipset is further to power down analog activity detector when the link is in the normal power state.

* * * * *